US010322360B2

(12) United States Patent
Ganguli et al.

(10) Patent No.: US 10,322,360 B2
(45) Date of Patent: Jun. 18, 2019

(54) COATED GRANULAR FILTRATION MEDIA

(71) Applicant: Teledyne Scientific & Imaging, LLC, Thousand Oaks, CA (US)

(72) Inventors: Rahul Ganguli, Oak Park, CA (US); Vivek Mehrotra, Simi Valley, CA (US); Dennis Strauss, Ventura, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 406 days.

(21) Appl. No.: 15/141,864

(22) Filed: Apr. 29, 2016

(65) Prior Publication Data

US 2016/0317952 A1     Nov. 3, 2016

Related U.S. Application Data

(60) Provisional application No. 62/156,075, filed on May 1, 2015.

(51) Int. Cl.
    *C02F 1/28*        (2006.01)
    *B01D 24/46*       (2006.01)
    (Continued)

(52) U.S. Cl.
    CPC ...... *B01D 24/4631* (2013.01); *B01J 20/3204* (2013.01); *B01J 20/327* (2013.01); *B01J 20/3272* (2013.01); *B01J 20/3289* (2013.01); *B01J 20/3293* (2013.01); *C02F 1/288* (2013.01); *C02F 1/72* (2013.01); *C02F 1/722* (2013.01); *C02F 1/76* (2013.01); *C02F 1/281* (2013.01); *C02F 1/285* (2013.01); *C02F 2101/203* (2013.01); *C02F 2101/30* (2013.01);
    (Continued)

(58) Field of Classification Search
    CPC .......... C02F 1/281; C02F 1/285; C02F 1/288; C02F 1/72; C02F 1/722; C02F 1/76; C02F 2101/20; C02F 2101/30; C02F 2103/10; C02F 2303/16; B01J 20/3272; B01J 20/327; B01J 20/3289; B01J 20/3204; B01J 20/3293; B01D 24/4631
    See application file for complete search history.

(56) References Cited

U.S. PATENT DOCUMENTS 3,352,424 A * 11/1967 Guebert ............... B01J 20/3268
                                                   210/503
4,724,207 A    2/1988 Hou et al.
(Continued)

OTHER PUBLICATIONS

Shalev et al, Non-leaching antimicrobial surfaces through polydopamine bio-inspired coating of quaternary ammonium salts or an ultrashort antimicrobial lipopeptide, Feb. 2012, Journal of Materials Chemistry, vol. 22, pp. 2026-2032.*
(Continued)

*Primary Examiner* — Matthew O Savage
(74) *Attorney, Agent, or Firm* — K&L Gates LLP

(57) ABSTRACT

A coated granular filtration medium is formed by the deposition of an electrolyte layer onto core particles. The electrolyte layer comprises a cationic polyelectrolyte. The coated granular filtration medium provides a synergistic combination of filtration and in situ coagulation that enables efficient, effective, and economical decontamination of industrial and other wastewaters.

9 Claims, 7 Drawing Sheets

(51) Int. Cl.
  *C02F 1/72* (2006.01)
  *C02F 1/76* (2006.01)
  *B01J 20/32* (2006.01)
  *C02F 103/10* (2006.01)
  *C02F 101/30* (2006.01)
  *C02F 101/20* (2006.01)

(52) U.S. Cl.
  CPC ...... *C02F 2103/10* (2013.01); *C02F 2303/16* (2013.01)

(56) References Cited

U.S. PATENT DOCUMENTS

| | | | |
|---|---|---|---|
| 7,968,640 | B2 | 6/2011 | Ganguli et al. |
| 8,075,794 | B2 | 12/2011 | Gangull et al. |
| 8,313,797 | B2 | 11/2012 | Mack et al. |
| 8,356,959 | B2 | 1/2013 | Ganguli et al. |
| 8,546,002 | B2 | 10/2013 | Ganguli et al. |
| 8,622,224 | B2 | 1/2014 | Wang et al. |
| 9,067,807 | B2 | 6/2015 | Soane et al. |
| 2005/0252843 | A1* | 11/2005 | Saito ............ B01D 24/12 210/269 |
| 2008/0149566 | A1* | 6/2008 | Messersmith ........ C09D 5/1681 210/702 |
| 2009/0065435 | A1* | 3/2009 | Li .................. B01D 15/00 210/669 |
| 2010/0059433 | A1 | 3/2010 | Freeman et al. |
| 2011/0139701 | A1 | 6/2011 | Pearks et al. |
| 2011/0253634 | A1* | 10/2011 | Soane .................... C02F 1/28 210/680 |
| 2013/0334130 | A1 | 12/2013 | Ganguli et al. |

OTHER PUBLICATIONS

International Preliminary Report on Patentability for International Patent Application No. PCT/US2016/029926 dated Nov. 7, 2017.
Backwashing (water treatment). In Wikipedia. Retrieved Apr. 29, 2015, from http://en.wikipedia.org/wiki/Badwashing_%water_treatment%29.
"Vertical Air Scoured Pressure Sand Filters," PCI Africa Water Treatment Technology.
"Turbidity Methods & Measurement," EPA Guidance Manual, Turbidity Provisions, Apr. 1999, pp. 3-1-3-23.
"Zeta Potential an Introduction in 30 Minutes," Zetasizer nano series technical note, Malvern Instruments Ltd, pp. 1-6.
"The Zeta Potential," Electroacoustics Tutorials, Colloidal Dynamics, 1999, pp. 1-4.
Bolto, Brian and Gregory, John, "Organic polyelectrolytes in water treatment," Water Research , vol. 41, 2007, pp. 2301-2324.
Engelhardt, Terry, "Granular Media Filtration for Water Treatment Applications," 2012, pp. 1-61.
Getting, Thomas et al., Rehabilitating Gravity Filter Systems Using the Dual Parallel Lateral, the F.B. Leopold Company, Inc., pp. 1-12.
Júnior, J.A.A. and Baldo, J.B. (2014) "The Behavior of Zeta Potential of Silica Suspensions," New Journal of Glass and Ceramics, vol. 4, pp. 29-37.
Kashaev, Slava and Lee, Douglas W., "Deep Bed Nutshell Filter Evolution," Exterran Technical Paper, 2010, pp. 1-15.
Kim, Jinkeun and Lawler, Desmond F., "Characteristics of Zeta Potential Distribution in Silica Particles," Bull. Korean Chem. Soc., 2005, vol. 26, No. 7, pp. 1083-1089.
Satterfield, Zane, "Filter Backwashing," Tech Brief, Fall 2005, vol. 5, Issue 3, pp. 1-4.

* cited by examiner

COATED GRANULAR FILTRATION MEDIA

CROSS REFERENCE TO RELATED APPLICATIONS

This patent application is a non-provisional application under 35 U.S.C. § 111(a) and claims priority under 35 U.S.C. § 119(e) to U.S. Provisional Patent Application No. 62/156,075, filed on May 1, 2015. U.S. Provisional Patent Application No. 62/156,075 is incorporated-by-reference into this specification.

BACKGROUND

Enhanced oil and gas extraction techniques such as hydraulic fracturing produce significant amounts of wastewater containing undesirable contaminants including, for example, emulsified oils, polymers, suspended solids, divalent ions, and bacteria and other microbes. Concerns about the environmental and health effects of contaminated wastewaters drive interest in the development of more efficient, effective, and economical processes and materials for the treatment of wastewater to remove undesirable contaminants. Additionally, water conservation concerns provide further interest in developing enhanced wastewater treatment products and processes that will enable the efficient, effective, and economical reuse of wastewater in oil and gas extraction operations, such as hydraulic fracturing, and other industrial operations.

SUMMARY

This specification describes coated granular filtration media, filters comprising the coated granular filtration media, and processes for the production, use, and regeneration of the coated granular filtration media. The coated granular filtration media comprises an electrolyte layer and provides a synergistic combination of filtration and in situ coagulation that enables efficient, effective, and economical decontamination of industrial and other wastewaters.

In one example, a granular filtration medium comprises core particles; and an electrolyte layer comprising a cationic polyelectrolyte deposited on the core particles.

In one another example, a granular filtration medium comprises core particles; a primer layer comprising a non-ionic hydrophilic polymer deposited on the core particles; and an electrolyte layer comprising a cationic polyelectrolyte deposited on the primer layer.

In another example, a granular filtration medium comprises silica-based sand particles; a primer layer comprising polydopamine deposited on the silica-based sand particles; and an electrolyte layer comprising poly(diallyldimethyl-ammonium chloride) deposited on the primer layer.

In another example, a filter comprises the coated granular filtration medium, and a process for filtering water comprises flowing water through the filter. The process may optionally comprise mixing an oxidation agent with the water before flowing the water through the filter.

In another example, a process for the production of a granular filtration medium comprises contacting core particles with an aqueous solution comprising a cationic polyelectrolyte, wherein the cationic polyelectrolyte deposits on the core particles and forms an electrolyte layer.

In another example, a process for the production of a granular filtration medium comprises contacting core particles with an aqueous solution comprising non-ionic hydrophilic monomers, wherein the non-ionic hydrophilic monomers polymerize and deposit a primer layer on surfaces of the core particles, thereby forming intermediate particles comprising the primer layer, and wherein the primer layer comprises a non-ionic hydrophilic polymer; and contacting the intermediate particles with an aqueous solution comprising a cationic polyelectrolyte, wherein the cationic polyelectrolyte deposits on the primer layer and forms an electrolyte layer.

In another example, a process for the production of a granular filtration medium comprises contacting silica-based sand particles with an aqueous solution comprising dopamine, wherein the dopamine polymerizes and deposits a primer layer on surfaces of the core particles, thereby forming intermediate particles comprising the primer layer, and wherein the primer layer comprising polydopamine; and contacting the intermediate particles with an aqueous solution comprising poly(diallyldimethyl-ammonium chloride), wherein the poly(diallyldimethyl-ammonium chloride) deposits on the primer layer and forms an electrolyte layer.

In another example, a method for reprocessing a granular filtration medium is described. The granular filtration medium comprises core particles; and an electrolyte layer comprising a cationic polyelectrolyte deposited on the core particles. The process comprises discontinuing filtration; contacting the granular filtration medium with an aqueous solution comprising an anionic polyelectrolyte; air scouring the granular filtration medium for at least a portion of the time during which the granular filtration medium contacts the aqueous solution comprising the anionic polyelectrolyte; and rinsing the air scoured granular filtration medium with water.

In another example, a method for reprocessing a granular filtration medium is described. The granular filtration medium comprises core particles; a primer layer comprising a non-ionic hydrophilic polymer deposited on the core particles; and an electrolyte layer comprising a cationic polyelectrolyte deposited on the primer layer. The process comprises discontinuing filtration; contacting the granular filtration medium with an aqueous solution comprising an anionic polyelectrolyte and/or an oxidation agent; air scouring the granular filtration medium for at least a portion of the time during which the granular filtration medium contacts the aqueous solution comprising the anionic polyelectrolyte and/or the oxidation agent; and rinsing the air scoured granular filtration medium with water.

It is understood that the inventions described in this specification are not necessarily limited to the examples summarized in this Summary.

BRIEF DESCRIPTION OF THE DRAWINGS

Various features and characteristics of the inventions described in this specification may be more thoroughly understood by reference to the accompanying figures, in which:

FIGS. 3A and 3B are schematic diagrams in side cross-sectional view, not to scale, of a portion of a filter bed comprising a coated granular filtration medium, wherein FIG. 3A illustrates a tortuous flow path through the coated granular filtration medium, and FIG. 3B illustrates the combination of filtration and in situ coagulation in the filter bed;

The reader will appreciate the foregoing features and characteristics, as well as others, upon considering the following detailed description of the inventions according to this specification.

DESCRIPTION

Figure 1:
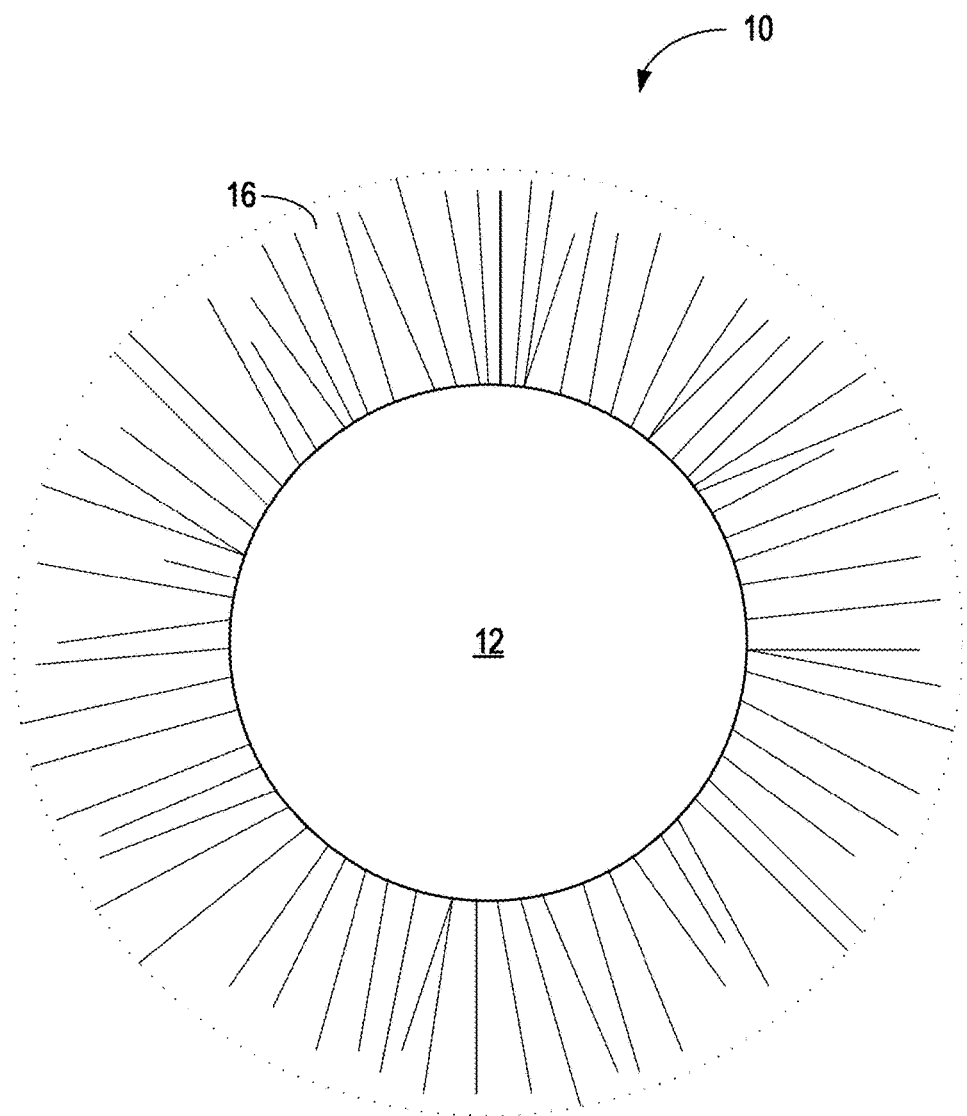
FIG. 1 is a schematic diagram in cross-sectional view, not to scale, of a granular filtration medium particle comprising an electrolyte layer.
Figure 2:
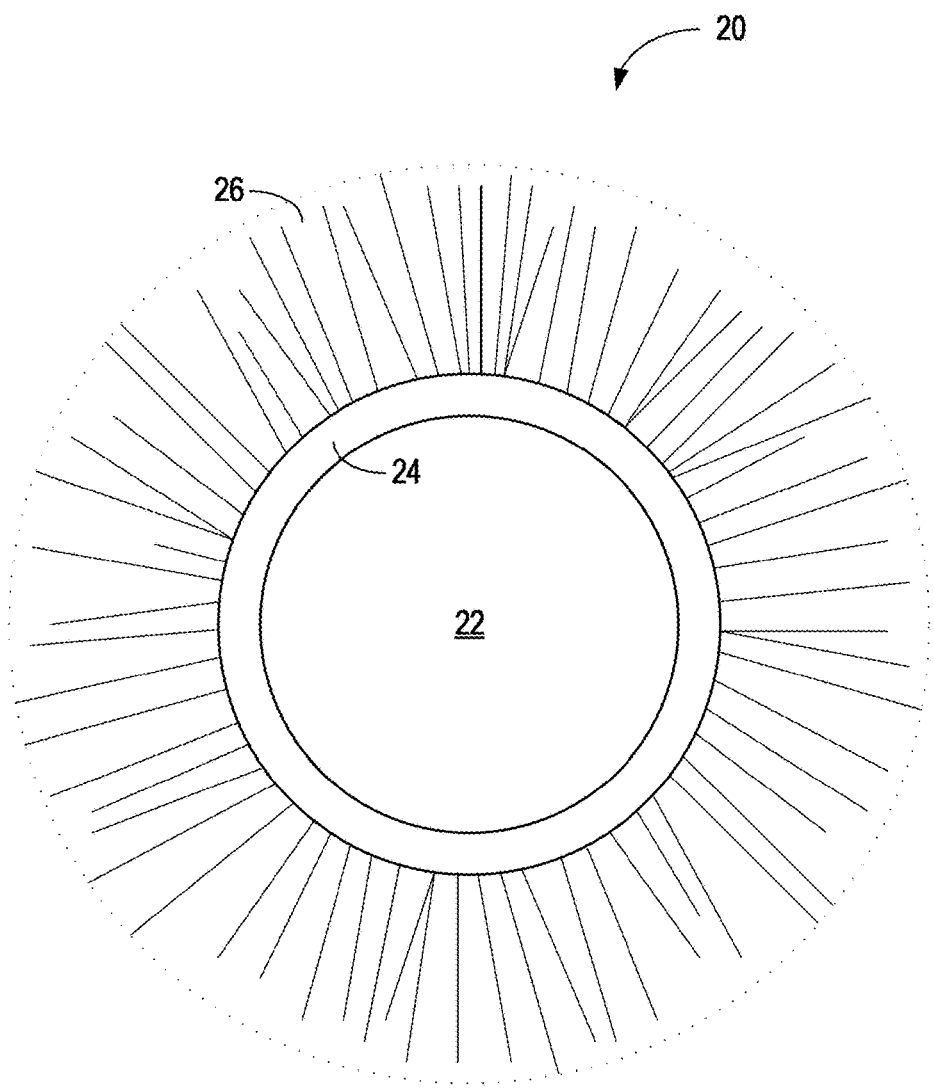
FIG. 2 is a schematic diagram in cross-sectional view, not to scale, of a granular filtration medium particle comprising a primer layer and an electrolyte layer.

The inventions described in this specification provide beneficial enhancements to granular filtration technology and include a coated granular filtration medium. Referring to FIG. 1, a coated granular filtration medium comprises coated particles 10. The coated particles 10 comprise core particles 12 and an electrolyte layer 16 deposited on the core particles 12. The electrolyte layer 16 comprises a cationic polyelectrolyte. The coated granular filtration medium may also comprise an optional primer layer deposited on the core particles between the core particles and the electrolyte layer, wherein the electrolyte layer is deposited on the primer layer. Referring to FIG. 2, a coated granular filtration medium comprises coated particles 20. The coated particles 20 comprise core particles 22, a primer layer 24 deposited on the core particles 22, and an electrolyte layer 26 deposited on the primer layer 24. The primer layer 24 comprises a non-ionic hydrophilic polymer, and the electrolyte layer 26 comprises a cationic polyelectrolyte.

The core particles function as substrates for the primer layer and/or the electrolyte layer, which deposit on and at least partially coat the underlying core particles. The core particles comprise a suitable granular medium such as, for example, silica-based sand, non-silica-based sand (e.g., calcium carbonate-based sand), granular anthracite (coal), granular activated carbon (GAC), granular magnetite, and combinations of any thereof. As used in this specification, the term "silica-based sand" refers to sand in which silicon dioxide and/or other silicate-based minerals are the largest constituents of the sand's chemical composition. Accordingly, "silica-based sands" include granular silicon dioxide (100% $SiO_2$ and incidental impurities), quartz sands, and other sands comprising predominantly silicon dioxide and/or other silicate minerals. Sands obtained from inland continental locations and non-tropical coastal locations are generally silica-based sands, as are sands derived from most sedimentary, igneous, and metamorphic rock sources. An exception is sand derived principally from limestone, which is calcium carbonate-based sand.

The core particles may have an effective particle size of 1,000 micrometers or less. For example, the core particles may have an effective particle size in the range of 10-1,000 micrometers, or any sub-range subsumed therein, such as, for example, 50-500 μm, 50-250 μm, 50-150 μm, 75-150 μm, or 75-125 μm. As used in this specification, the term "effective particle size" means the size of a sieve screen opening that retains 90 percent by dry weight of a representative sample of granular media particles and passes 10 percent by dry weight of the sample of the granular media particles. For example, if the particle size distribution of a granular medium is such that 10 percent by dry weight of a sample is finer than 105 micrometers (i.e., 10% of the particles pass a U.S. Standard Mesh No. 140), then the granular medium has an effective particle size of 105 micrometers.

The core particles may have a particle size such that at least 90 percent by dry weight of the core particles pass through a U.S. Standard Mesh No. 18 (1000 μm), or any other U.S. Standard Mesh number greater than U.S. Standard Mesh No. 18, e.g., No. 20 (841 μm), No. 25 (707 μm), No. 30 (595 μm), No. 35 (500 μm), No. 40 (420 μm), No. 45 (354 μm), No. 50 (297 μm), No. 60 (250 μm), No. 70 (210 μm), No. 80 (177 μm), No. 100 (149 μm), No. 120 (125 μm), No. 140 (105 μm), No. 170 (88 μm), No. 200 (74 μm), No. 230 (63 μm), No. 270 (53 μm), No. 325 (44 μm), or No. 400 (37 μm). The core particles may have a particle size such that at least 90 percent by dry weight of the core particles retain on a U.S. Standard Mesh No. 500 (25 μm), or any other U.S. Standard Mesh number less than U.S. Standard Mesh No. 500, e.g., No. 400 (37 μm), No. 325 (44 μm), No. 270 (53 μm), No. 230 (63 μm), No. 200 (74 μm), No. 170 (88 μm), No. 140 (105 μm), No. 120 (125 μm), No. 100 (149 μm), No. 80 (177 μm), No. 70 (210 μm), No. 60 (250 μm), No. 50 (297 μm), No. 45 (354 μm), No. 40 (420 μm), No. 35 (500 μm), No. 30 (595 μm), No. 25 (707 μm), or No. 20 (841 μm). The core particles may have a particle size such that at least 90 percent by dry weight of the particles pass through a U.S. Standard Mesh No. 18 (1000 micrometers) and at least 90% by dry weight retain on a U.S. Standard Mesh No. 500 (25 micrometers), or any other combination of U.S. Standard Mesh numbers between and including Nos. 18 and 500. For example, the core particles may have a particle size such that at least 90 percent by dry weight of the particles pass through a U.S. Standard Mesh No. 60 (250 μm) and at least 90% by dry weight retain on a U.S. Standard Mesh No. 270 (53 μm). The core particles may have a particle size such that at least 90 percent by dry weight of the particles pass through a U.S. Standard Mesh No. 120 (125 μm) and at least 90% by dry weight retain on a U.S. Standard Mesh No. 200 (74 μm).

An optional primer layer modifies the surface properties of the core particles. An optional primer layer may provide a surface more suitable for the reversible deposition and electrostatic bonding of the electrolyte layer by modifying the electrostatic properties of the surfaces of the core particles. Generally, most particles acquire a surface electrical charge when brought into contact with water as a result of one or more principal mechanisms: direct dissociation or ionization of surface groups; crystal lattice imperfections at the solid surface; isomorphic replacements within the crystal lattice; or preferential adsorption of ions from solution. For most solid particles in contact with water in a moderate pH range (e.g., 3-10), the surface electrical charge is usually negative. This surface electrical charge can be quantified as a zeta potential value measured using electrokinetic techniques such as particle electrophoresis, streaming potential measurements, or electro-osmosis. Thus, the zeta potentials of solid materials in water or aqueous solutions largely influence the coagulation and flocculation behavior of the materials, as well as the capacity of charged solutes to adsorb or otherwise deposit on the solid material surfaces.

Solid materials having large zeta potential absolute values tend to repel each other in water or aqueous solutions and, therefore, can generally form stable colloidal suspensions depending on the size and density of the solid material particles. In like manner, solid materials having large zeta potential values will strongly attract ionic compounds having a charge of opposite polarity. As a result, in aqueous solutions comprising ionic compounds, solid materials having large zeta potential values of opposite polarity can form strong electrostatic bonds with the ionic compounds.

As an example, silicon dioxide (and silica-based sands) have an isoelectric point (IEP) of about 2.0 (i.e., the pH of a solution in which the net electrical charge of a particle is zero). Consequently, in aqueous solutions with a pH greater than about 2.0, silica-based sand particles have negative zeta potentials. Additionally, the zeta potentials of silica-based sands are relatively large at pH values greater than about 2.0. For example, silicon dioxide particles have zeta potential values ranging from about −25 mV to about −65 mV in solutions with pH values ranging from about 3.0 to about 10.0. Accordingly, silica-based sand particles in contact with aqueous solutions containing cationic compounds can strongly attract the cationic compounds and form stable electrostatic bonds with the cationic compounds such as cationic polyelectrolytes.

The formation of strong electrostatic bonds between core particles (e.g., silica-based sand particles) and cationic polyelectrolyte compounds can be advantageous in terms of stably immobilizing the cationic polyelectrolyte compounds on the substrate particles. However, the formation of electrostatic bonds between core particles and cationic polyelectrolyte compounds that are too strong can be disadvantageous in terms of the ability to remove contaminants coagulated with the cationic polyelectrolyte compounds from the core particles. Accordingly, it may be advantageous to modify the electrostatic properties of the surfaces of the core particles to provide a surface exhibiting a zeta potential with an absolute value that is less than the absolute value of the zeta potential of the core particles. In this manner, an optional primer layer may provide a surface that electrostatically binds cationic polyelectrolyte compounds with sufficient strength to immobilize the compounds under filtration conditions, but still allow for the disruption of the electrostatic bonds and removal of the cationic polyelectrolyte compounds and coagulated contaminants in order to clean and regenerate the polyelectrolyte-coated granular filtration media. In other words, an optional primer layer may facilitate the reversible deposition and electrostatic bonding of the electrolyte layer to the core particles.

An optional primer layer may comprise a non-ionic hydrophilic polymer. A primer layer may comprise a non-ionic hydrophilic polymer having a zeta potential with an absolute value that is less than an absolute value of a zeta potential of the core particles. The zeta potentials of the non-ionic hydrophilic polymer and the core particles can be determined without undue experimentation using known electrokinetic techniques, such as particle electrophoresis, streaming potential measurements, or electro-osmosis, and applying known electrokinetic models such as the Smoluchowski equation or the Hückel equation.

A primer layer may comprise a non-ionic hydrophilic polymer having pendant amine groups. A primer layer may comprise a non-ionic hydrophilic polymer having pendant hydroxyl groups. A primer layer may comprise a non-ionic hydrophilic polymer having pendant amine groups and pendant hydroxyl groups.

A primer layer may comprise polydopamine. A primer layer may comprise a polymeric dopamine derivative. As used in this specification, the term "dopamine derivative" refers to compounds based on the dopamine molecule:

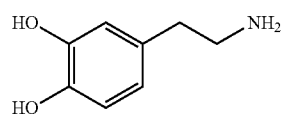 [SMILES: NCCc1ccc(O)c(O)c1]

Examples of monomeric dopamine derivatives include, but are not limited to, epinephrine:

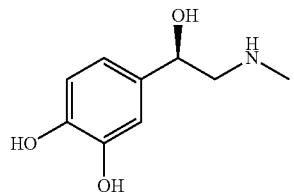

and norepinephrine:

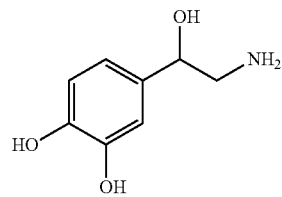 [SMILES: NCC(O)c1ccc(O)c(O)c1]

The polymerization of dopamine and monomeric dopamine derivatives is described, for example, in U.S. Patent Application Publication Nos. 2010/0059433 A1 and 2013/0334130 A1, which are both incorporated-by-reference into this specification. When monomeric dopamine or dopamine derivatives are mixed with water at alkaline pH (i.e., pH greater than 7.0), an oxidation-polymerization reaction occurs and results in the deposition of non-ionic, hydrophilic polydopamine layers (or polymeric dopamine derivative layers, such as, for example, polyepinephrine layers or polynorepinephrine layers) on solid material surfaces (e.g., core particles) in contact with the reaction solution. The non-ionic, hydrophilic polydopamine (or polymeric dopamine derivative) reaction products contain pendant amine groups and pendant hydroxyl groups. For example, in the case of polydopamine, a polymerization reaction product may have a structure like the following:

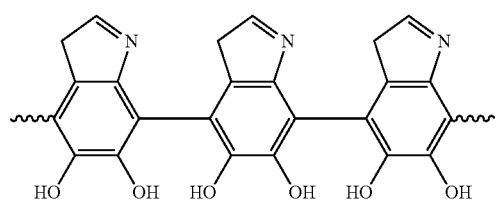

A primer layer can also comprise a conformal coating comprising a hydrophilic polymer and a surfactant as described, for example, in U.S. Patent Application Publication No. 2013/0334130 A1, which is incorporated-by-reference into this specification.

A primer layer may comprise one, two, or more different non-ionic hydrophilic polymers. A primer layer can be produced on core particles by contacting the core particles with an aqueous solution comprising non-ionic hydrophilic monomers, wherein the non-ionic hydrophilic monomers polymerize in situ and deposit on the surfaces of the core particles to form the primer layer, and wherein the primer layer comprises a non-ionic hydrophilic polymer reaction product. The deposition of the non-ionic hydrophilic polymer, and the formation of the primer layer, produces intermediate particles. The electrolyte layer can then be produced on the primer layer by contacting the intermediate particles with an aqueous solution comprising a cationic polyelectrolyte, wherein the cationic polyelectrolyte deposits on the primer layer and forms the electrolyte layer. In examples without a primer layer, the electrolyte layer can be produced directly on the core particles by contacting the core particles with an aqueous solution comprising the cationic polyelectrolyte, wherein the cationic polyelectrolyte deposits on the core particles and forms the electrolyte layer.

The electrolyte layer comprises the deposited cationic polyelectrolyte. Unlike an optional primer layer, the deposition of the electrolyte layer does not comprise an in situ polymerization reaction. Instead, the cationic polyelectrolyte in the aqueous solution is electrostatically attracted to the surfaces of the core particles (typically having negative zeta potentials), or to the non-ionic hydrophilic polymer in the optional primer layer, and deposits by forming electrostatic bonds. As used in this specification, the term "cationic polyelectrolyte" refers to water-soluble polymers that ionize in aqueous solution to form positively charged sites along the polymer chain.

The cationic polyelectrolyte (and thus the electrolyte layer) may comprise polymers comprising pendant quaternary ammonium groups along the polymer chain. Examples of such polymers include, but not limited to, polyacrylamide derivatives and copolymers such as poly(acrylamide-co-diallyldimethyl-ammonium chloride) or poly(acrylamide-co-(meth)acryloyloxyethyltrimethyl-ammonium chloride). The cationic polyelectrolyte (and thus the electrolyte layer) may comprise polymers such as poly(allyl-amine hydrochloride) and the polymeric reaction product of epichlorohydrin and dimethylamine (ECH/DMA polymer). The cationic polyelectrolyte (and thus the electrolyte layer) may comprise poly(diallyldimethyl-ammonium chloride) (poly(DADMAC)). The electrolyte layer may comprise one, two, or more different cationic polyelectrolytes. The cationic polyelectrolytes may have a weight average molecular weight up to 1,000,000 grams-per-mol, or any sub-range subsumed therein, such as, for example, 250,000-750,000 g/mol or 400,000-500,000 g/mol.

Referring again to FIGS. 1 and 2, the electrolyte layers 16/26 are shown having a "nanobrush" morphology in which a portion of the deposited cationic polyelectrolyte polymers project outwardly from the surface of the core particle 12 or the primer layer 24 (as the case may be) in a brush-like configuration. Without intending to be bound by theory, it is believed that this "nanobrush" morphology provides for improved coagulation when contaminants contact the electrolyte layer because the cationic sites on the polyelectrolyte polymers are less sterically hindered.

The coated granular filtration medium may comprise any combination of the above-described core particles, non-ionic hydrophilic polymers in the optional primer layer, and cationic polyelectrolytes in the electrolyte layer. For example, the granular filtration medium may comprise silica-based sand particles, an optional primer layer comprising polydopamine deposited on the silica-based sand particles, and an electrolyte layer comprising poly(diallyldimethyl-ammonium chloride) deposited on the core particles or on the optional primer layer.

When incorporated into a media filter, the coated granular filtration medium provides a synergistic combination of filtration and in situ coagulation that enables efficient, effective, and economical treatment and decontamination of wastewater. In conventional filtration technology, water may be chemically treated before filtration to enhance the ability of the filters to remove particles. Such filtration pre-treatments typically involved the addition of chemicals to the feed water to cause coagulation and flocculation. As used in this specification, the term "coagulation" refers to the agglomeration of smaller contaminant particles into a larger (typically gelatinous) mass due to the neutralization of charges on the contaminant particles resulting from contact with an electrolyte compound. As used in this specification, the term "flocculation" refers to the agglomeration of coagulated contaminant particles into even larger particles (flocs) due to collisions between coagulated particles and gels.

Figure 3A:
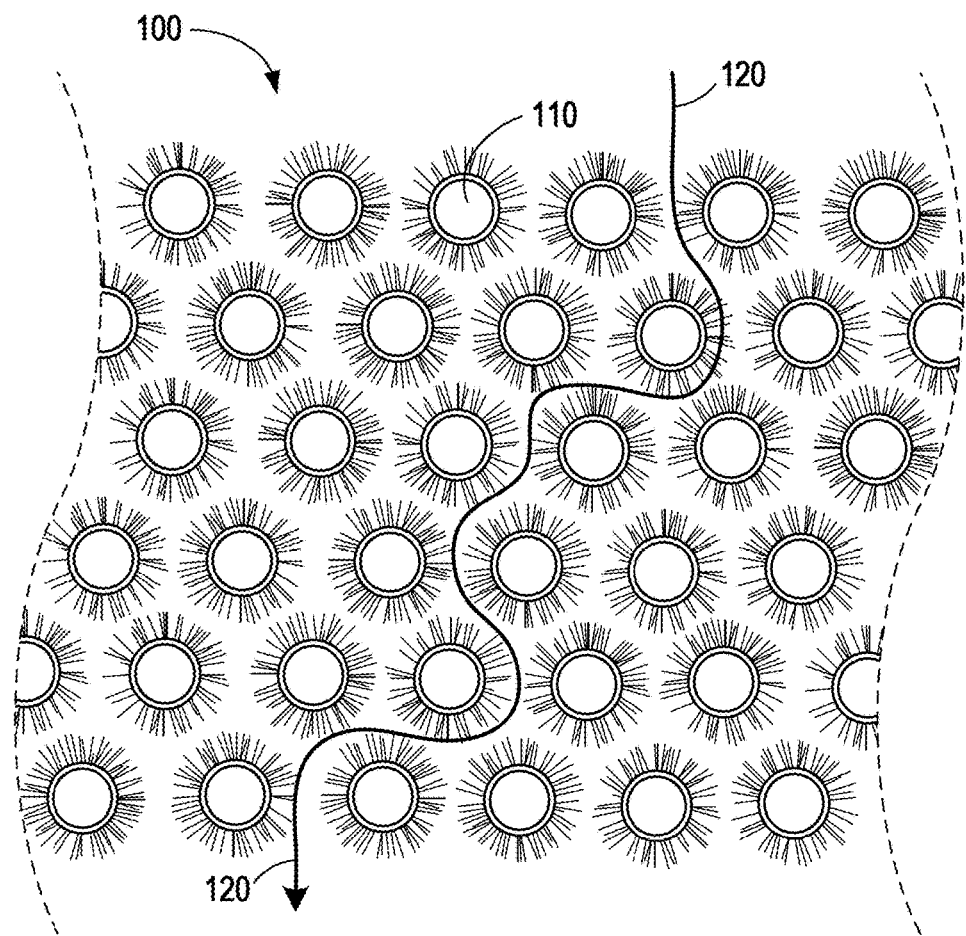
Figure 3B:
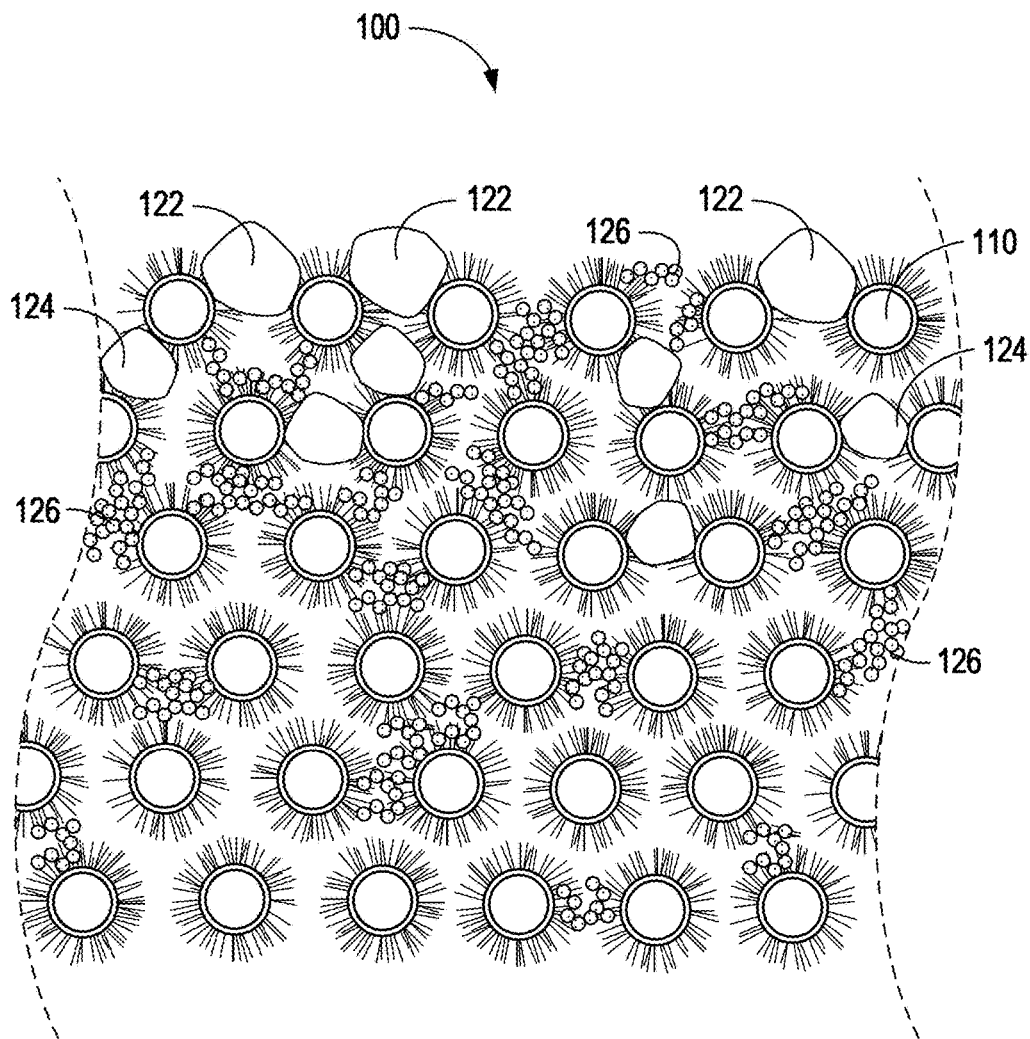

Referring to FIG. 3A, a media bed 100 in a filter comprises granular filtration medium particles 110, wherein each particle comprises a core particle, a optional primer layer, and an electrolyte layer (although the particles 110 are shown in FIGS. 3A and 3B with an optional primer layer, it is understood that the same principles apply to examples without an optional primer layer). Without intending to be bound by theory, when wastewater flows through the media bed 100, the small size of the granular filtration medium particles 110 (e.g., less than 1,000 micron effective particle size) produces a tortuous flow pathway—an example of which is indicated by arrow 120—that results in a high frequency of collisions between contaminants in the flowing wastewater and the cationic polyelectrolyte in the electrolyte layer. The high frequency of collisions between contaminants and the cationic polyelectrolyte provides for in situ coagulation in the media bed 100, thus reducing or eliminating the need for pre-treatment of the wastewater with separate coagulating or flocculating agents.

Referring to FIG. 3B, the synergistic combination of filtration and in situ coagulation is illustrated by the retention of larger contaminant particles 122 and 124 based on size exclusion from the interstitial spaces between the granular filtration medium particles 110, and the coagulation of smaller contaminant particles 126, and the retention of the coagulated particles, throughout the depth of the media bed 100. The simultaneous performance of both size exclusion filtration and coagulation of contaminants in the media bed 100 makes filtration more efficient by reducing or eliminating the need for pre-treatment of the wastewater with separate coagulating or flocculating agents. The in situ coagulation also provides the added benefit of forming coagulated contaminant aggregates throughout the entire depth of the media bed 100, thus increasing utilization of the medium particles 110, as compared to pre-coagulation in which contaminant flocs of relatively large size form before contacting a filtration medium, and are therefore filtered out by size exclusion in a relatively shallow upstream depth of the media bed, thus increasing the rate of clogging of the media bed during filtration.

The coated granular filtration medium functions by both coagulating and size-excluding contaminants. It was observed that simply suspending or immersing a coated granular filtration medium in accordance with this specification in wastewater did not result in the substantial removal of contaminants. Thus, the removal of contaminants from wastewater with the coated granular filtration medium does not operate based merely on adsorption; rather, the observed enhanced filtration performance of the coated granular filtration medium results from the synergistic combination of filtration and in situ coagulation, which provides unexpectedly high filtration performance.

Figure 4:
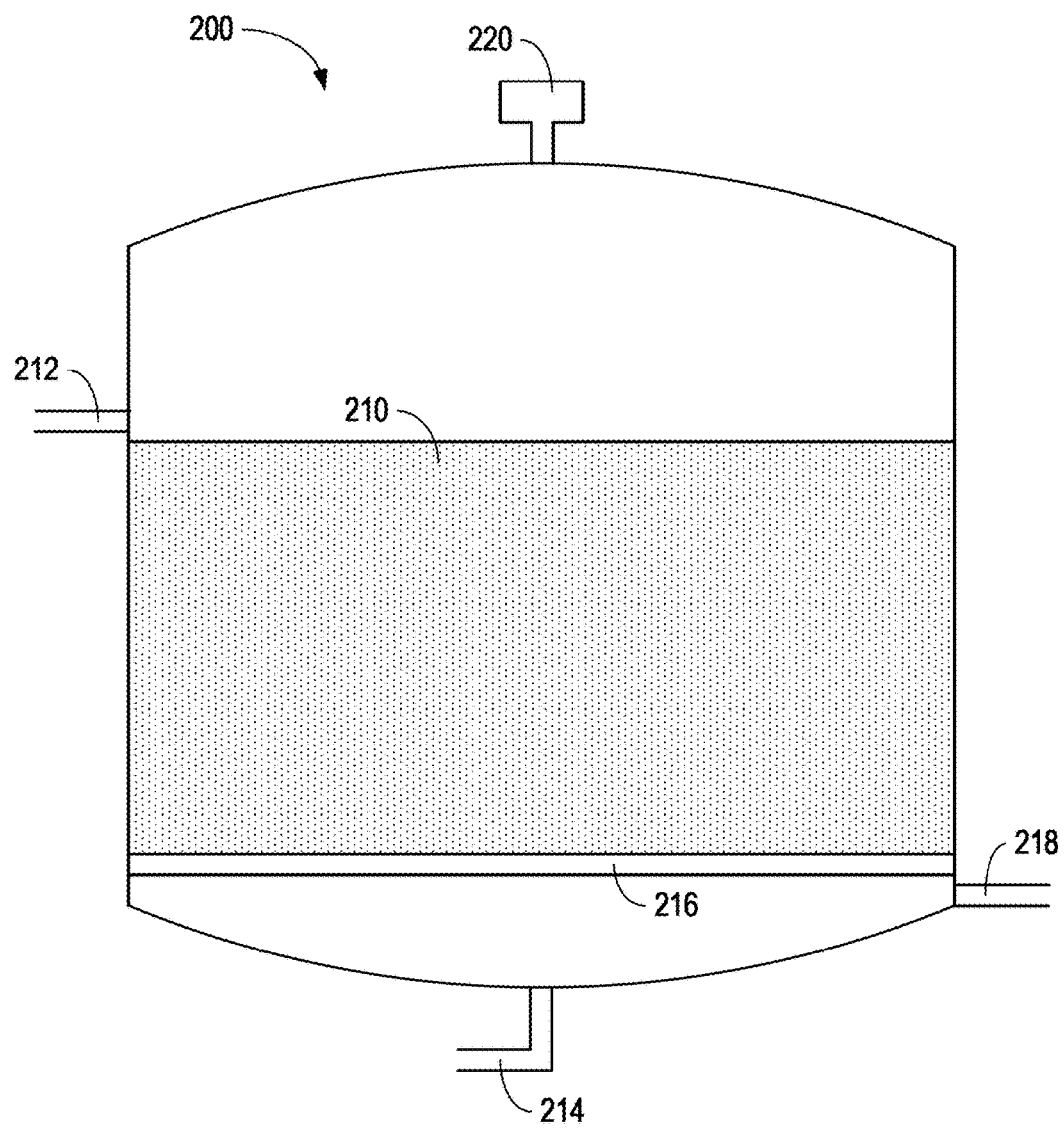
FIG. 4 is a schematic diagram in side cross-sectional view, not to scale, of a vertical-type pressure filter.

The various examples of the invention described in this specification include the coated granular filtration medium described above as well as filters comprising the coated granular filtration medium. Filters comprising a granular filtration medium comprising a core particle, an optional primer layer, and an electrolyte layer can remove contaminant particles larger than about 2-5 micrometers from wastewater through size exclusion, and particles smaller than about 2-5 micrometers through coagulation. Therefore, particles having sizes much less than about 2-5 micrometers (e.g., submicron and nano-scale contaminant particles) can be removed from wastewater through both size exclusion and coagulation effects in filters comprising the coated granular filtration medium. The coated granular filtration medium can be used in any type of media filters, such as, for example, gravity filters and vertical and horizontal pressure filters. For example, FIG. 4 shows a vertical-type pressure filter 200 comprising an inlet 212, an outlet 214, an air scour inlet 218, an air release valve 220, a nozzle plate or other media bed support structure 216, and a media bed 210 comprising a granular filtration medium comprising core particles having an electrolyte layer and an optional primer layer.

The various examples of the invention described in this specification also include processes for filtering water. A process for filtering water may comprise flowing water through a filter comprising a granular filtration medium comprising a core particle, an optional primer layer, and an electrolyte layer, as described above. A process for filtering water may also comprise mixing an oxidation agent with the water before flowing the water through the filter. The oxidation agent may comprise an aqueous sodium hypochlorite (bleach) solution, an aqueous hydrogen peroxide solution, or an aqueous permanganate ($MnO_4$) salt solution.

The addition of an oxidation agent to water before filtering the water through a granular filtration medium comprising a core particle, an optional primer layer, and an electrolyte layer may further enhance the removal of contaminants, particularly sub-micron sized contaminant particles, by at least partially oxidizing the contaminants and providing negative charges on the contaminants. For example, in wastewater containing iron compounds, an oxidation agent may oxidize the iron from a divalent ($Fe2^+$) to a trivalent ($Fe3^+$) oxidation state, and trivalent (ferric) iron ions and salts provide strong coagulation effects in wastewater (e.g., ferric salts such as ferric sulfate ($Fe_2(SO_4)_3$) and ferric chloride ($FeCl_3$) are strong coagulants). Thus, the presence of oxidized ferric ions and salts in wastewater may function synergistically with the coated granular filtration medium to achieve even higher levels of contaminant removal, particularly sub-micron sized contaminant particles. Additionally, the mixing of an oxidation agent with wastewater before filtering the wastewater through a coated granular filtration medium may at least partially oxidize organic materials (e.g., microbes, polymers, and the like) in the wastewater, thereby introducing negative charges on the organic materials which enhance the attraction of the organic materials to the cationic polyelectrolyte in the electrode layer.

An oxidation agent such as sodium hypochlorite (bleach), a peroxide, or a permanganate ($MnO_4^-$) salt may be added to water before filtering the water in an amount of 1-1,000 ppm by weight, or any sub-range subsumed therein, such as, for example, 2-500 ppm or 2-100 ppm.

The various examples of the invention described in this specification also include processes for the production of a coated granular filtration medium. As described above, core particles (e.g., sand) are contacted with an aqueous solution comprising a cationic polyelectrolyte (e.g., poly(diallyldimethyl-ammonium chloride)). The cationic polyelectrolyte deposits on the core particles and forms the electrolyte layer. Optionally, before contacting the cationic polyelectrolyte solution, the core particles may be contacted with an aqueous solution comprising non-ionic hydrophilic monomers (e.g., dopamine). The non-ionic hydrophilic monomers may polymerize and deposit an optional primer layer on the surfaces of the core particles, thereby forming intermediate particles comprising the optional primer layer. The optional primer layer may comprise a non-ionic hydrophilic polymer (e.g., polydopamine) that is a reaction product of the non-ionic hydrophilic monomers. The intermediate particles are contracted with the aqueous solution comprising the cationic polyelectrolyte (e.g., poly(diallyldimethyl-ammonium chloride)). The cationic polyelectrolyte deposits on the optional primer layer and forms the electrolyte layer. The processes for the production of the granular filtration medium may use any combination of the above-described core particles, non-ionic hydrophilic monomers and polymers, and cationic polyelectrolytes.

The core particles may be washed with clean water to remove dust and ultrafine particles (e.g., <50 micrometers) and residual chemicals that may be present from the source or supplier of the core particles. As used herein, the term "clean water" refers to water having at least a cleanliness level provided by municipal water sources (i.e., tap water), and may include, but does not require, further purification such as distillation and/or deionization. The aqueous solution comprising the non-ionic hydrophilic monomers may be prepared by dissolving the monomers in a buffered solution having a pH ranging from 6.5 to 10.0, or any sub-range subsumed therein, such as, for example 7.0-9.0, 7.5-8.5, 8.0-8.5, or 8.1-8.2. The non-ionic hydrophilic monomers may be dissolved in the buffered solution at a concentration of 0.05-5% by weight, or any sub-range subsumed therein, such as, for example, 0.05-2%, 0.1-1%, or 0.1-0.5%. The core particles may be contacted with the aqueous solution comprising the non-ionic hydrophilic monomers for a period of time sufficient for the polymerization and deposition to occur. For example, the core particles may be contacted with the aqueous solution comprising the non-ionic hydrophilic monomers for a period of time ranging from 10 minutes to 5.0 hours, or any sub-range subsumed therein, such as, for example, 15 minutes to 4.0 hours, 30 minutes to 3.0 hours, 1.0-2.0 hours, 1.5-3.0 hours, 2.0-4.0 hours, or 1.5-2.5 hours. The core particles may be contacted with the aqueous solution without agitation.

At the end of the contact time, the aqueous solution comprising the non-ionic hydrophilic monomers may be drained from the core particles, which are now intermediate particles comprising an optional primer layer. The intermediate particles may be washed with clean water and dried before subsequent processing. The intermediate particles may be air dried at ambient temperature, dried using forced air at ambient temperature, air dried at an elevated temperature, or dried using forced air at an elevated temperature. Elevated temperatures for drying the intermediate particles may range from greater than ambient temperature up to 100° C., or any sub-range subsumed therein, such as, for example, 50-100° C. or 60-100° C.

After optional washing and/or drying, the intermediate particles are contacted with the aqueous solution comprising the cationic polyelectrolyte, or in examples lacking an optional primer layer, the core particles are contacted with the cationic polyelectrolyte solution. The cationic polyelectrolyte solution may be prepared by dissolving the cationic polyelectrolyte in clean water at a concentration of 10-10,000 ppm by weight, or any sub-range subsumed therein, such as, for example, 100-5,000 ppm, 500-4,500 ppm, 1,000-4,000 ppm, or 2,000-4,000 ppm. The core or intermediate particles may be contacted with the cationic polyelectrolyte solution for a period of time ranging from 10 minutes to 1.0 hour, or any sub-range subsumed therein, such as, for example, 10-30 minutes, 10-20 minutes, or 15-20 minutes.

The core or intermediate particles may be contacted with the cationic polyelectrolyte solution under agitation for at least a portion of the contact time. For example, core or intermediate particles and the cationic polyelectrolyte solution may be contacted for a period of time under agitation ranging from 3-20 minutes, followed by a period of time without agitation ranging from 7-40 minutes, or any sub-ranges subsumed therein, such as, for example, 5-10 minutes under agitation and 10-15 minutes without agitation.

The agitation may be provided using an air scouring operation. As used in this specification, the term "air scouring" refers to the introduction of compressed air (i.e., air at a gauge pressure greater than zero and absolute pressure greater than ambient atmospheric pressure) into a mixture comprising solid particles and water. During at least a portion of the period of contact between the core or intermediate particles and the cationic polyelectrolyte solution, the core or intermediate particles may be air scoured. For example, the core or intermediate particles and the cationic polyelectrolyte solution may be air scoured for 3-20 minutes or 5-10 minutes, and then allowed to rest in contact for an additional 7-40 minutes or 10-15 minutes.

The contacting of the core particles and the non-ionic hydrophilic monomer solution (to form an optional primer layer), and the contacting of the core or intermediate particles and the cationic polyelectrolyte solution (to form the electrolyte layer), can be performed independently, for example, in a separate granular filtration medium production vessel or directly in a media bed in a filter apparatus. For example, the core particles and the non-ionic hydrophilic monomer solution may be contracted in a separate production vessel, and after the formation of the optional primer layer, and any optional washing and/or drying operation, the intermediate particles may be transferred into the media bed of a filter apparatus. In the media bed in the filter apparatus, the intermediate particles (or core particles in examples lacking an optional primer layer) may be contacted with the cationic polyelectrolyte solution, including providing optional agitation with an air scouring operation for at least a portion of the contact time, and thereby form the electrolyte layer in situ in the filter apparatus.

The various examples of the invention described in this specification also include methods for reprocessing a coated granular filtration medium comprising core particles, an optional primer layer, and an electrolyte layer. After a period of filtration using the coated granular filtration medium, the capacity of the medium to remove contaminants at a practical throughput will become exhausted as the available positively charged sites on the cationic polyelectrolyte in the electrolyte layers are effectively consumed. At that point, filtration is discontinued and the used granular filtration medium is contacted with an aqueous solution comprising an anionic polyelectrolyte, an oxidation agent, or both an anionic polyelectrolyte and an oxidation agent.

As used in this specification, the term "anionic polyelectrolyte" refers to water-soluble polymers that ionize in aqueous solution to form negatively charged sites along the polymer chain. The anionic polyelectrolyte may comprise polymers comprising pendant sulfonate groups along the polymer chain. Examples of such polymers include, but not limited to, polyacrylamide derivatives and copolymers, such as, for example, poly(2-acrylamido-2-methyl-1-propanesulfonate) sodium salt and poly(2-acrylamido-2-methyl-1-propanesulfonate-co-acrylonitrile) sodium salt. The anionic polyelectrolyte may comprise polymers such as poly(vinylsulfonate) sodium salt, poly(vinyl-sulfate) potassium salt, poly(styrene sulfonate-co-maleic acid) sodium salt, poly(anetholesulfonate) sodium salt, or poly(acrylic acid) sodium salt. The anionic polyelectrolyte may comprise poly(styrene sulfonate) sodium salt (PSS) or derivatives or copolymers of PSS. One, two, or more different anionic polyelectrolytes may be used in the methods for reprocessing coated granular filtration media. The anionic polyelectrolytes may have a weight average molecular weight up to 1,000,000 grams-per-mol, or any sub-range subsumed therein, such as, for example, 10,000-200,000 g/mol, 50,000-150,000 g/mol, or 75,000-125,000 g/mol.

The aqueous solution comprising the anionic polyelectrolyte may be prepared by dissolving the anionic polyelectrolyte in clean water at a concentration of 10-10,000 ppm by weight, or any sub-range subsumed therein, such as, for example, 100-5,000 ppm, 500-4,500 ppm, 1,000-4,500 ppm, or 3,500-4,500 ppm. The used, coated granular filtration medium may be contacted with the anionic polyelectrolyte solution for a period of time ranging from 5 minutes to 30 minutes, or any sub-range subsumed therein, such as, for example, 5-25 minutes, 5-15 minutes, or 10-15 minutes. The granular filtration medium and anionic polyelectrolyte may be air scoured for at least a portion of the contact time. The granular filtration medium and anionic polyelectrolyte solution may be air scoured for essentially the entire contact time.

The aqueous solution comprising the oxidation agent may be prepared by dissolving the oxidation agent in clean water at a concentration of 0.5-100 ppm by weight, or any sub-range subsumed therein, such as, for example, 1-100 ppm, 10-100 ppm, 10-50 ppm, or 50-100 ppm. The oxidation agent may comprise sodium hypochlorite (bleach), a peroxide, or a permanganate ($MnO_4^-$) salt, for example. The used, coated granular filtration medium may be contacted with the oxidation agent solution for a period of time ranging from 5 minutes to 30 minutes, or any sub-range subsumed therein, such as, for example, 5-25 minutes, 5-15 minutes, or 10-15 minutes. The granular filtration medium and oxidation agent may be air scoured for at least a portion of the contact time. The granular filtration medium and anionic polyelectrolyte solution may be air scoured for essentially the entire contact time.

An anionic polyelectrolyte and an oxidation agent maybe used in combination, for example, dissolved into separate aqueous solutions that are used together in series or in parallel to contact a used, coated granular filtration medium and remove coagulated aggregates comprising the cationic polyelectrolyte and contaminants from the underlying primer layer and/or core particles. Alternatively, an anionic polyelectrolyte and an oxidation agent may be used in combination by dissolving the anionic polyelectrolyte and the oxidation agent into a single aqueous solution that contacts a used, coated granular filtration medium and removes coagulated aggregates from the underlying primer layer and/or core particles. In another alternative, an anionic polyelectrolyte solution may be used without the use of any oxidation agents, or an oxidation agent solution may be used without the use of any anionic polyelectrolyte solution.

For example, referring again to FIG. 4, filtration in the filter 200 may be discontinued by stopping wastewater feed flow through the inlet 212, and allowing residual filtrate to drain through the outlet 214. The outlet 214 may then be closed and the anionic polyelectrolyte and/or oxidation agent solution(s) added to the media bed 210 through the inlet 212. After sufficient anionic polyelectrolyte and/or oxidation agent solution(s) are added to the media bed 210 to immerse the used granular filtration medium, compressed air may be fed to the bottom of the media bed 210 through the air scour inlet 218. The granular filtration medium and anionic polyelectrolyte and/or oxidation agent solution(s) may be air scoured for a period of time after which the air flow is discontinued. The outlet 214 may then be opened and the anionic polyelectrolyte and/or oxidation agent solution(s) drained from the media bed 210.

The anionic polyelectrolyte and/or oxidation agent functions to disrupt the electrostatic bonds between the cationic polyelectrolyte in the electrolyte layer and the surfaces of the core particles or the non-ionic hydrophilic polymer in the optional primer layer. The disruption of the electrostatic bonds allows the air scouring to dislodge coagulated aggregates comprising the cationic polyelectrolyte and contaminants, and strip the coagulated aggregates from the underlying primer layer and/or core particles. The concentration of anionic polyelectrolyte and/or oxidation agent in solution, the contact times, the contract temperatures, and the use and duration of air scouring may depend on the fouling potential and fouling chemical profile of the feedwater and the time between reprocessing operations.

After the air scouring is completed, the anionic polyelectrolyte and/or oxidation agent solution(s) may be drained and/or the granular filtration medium may be washed with clean water in a backwashing operation to rinse away the stripped coagulated aggregates and other contaminants entrained in the medium. A backwashing operation may be performed until the backwash flow exiting the media bed runs clear upon visual inspection (e.g., for 5-15 minutes). Referring again to FIG. 4, after the air scouring operation, and either after or instead of draining the media bed 210, clean water may be fed through outlet 214 (functioning as a backwash inlet) in reverse flow up through the media bed 210, and out through inlet 212 (functioning as a backwash outlet).

After the granular filtration medium is air scoured in contact with the anionic polyelectrolyte and/or oxidation agent solution(s) and rinsed with clean water, the medium particles are in a condition similar to the core particles or intermediate particles during initial production, i.e., comprising bare core particles or an optional primer layer, but not the electrolyte layer, which has been stripped away by the preceding air scouring operation with the anionic polyelectrolyte solution. The electrolyte layer may then be re-generated by contacting the rinsed granular filtration medium with an aqueous solution comprising the cationic polyelectrolyte (e.g., poly(diallyldimethyl-ammonium chloride)) under the same conditions discussed above in connection with the production of the coated granular filtration medium, wherein the cationic polyelectrolyte deposits on the core particles or an optional primer layer and regenerates the electrolyte layer in situ.

The rinsed granular filtration medium may be contacted with a cationic polyelectrolyte solution to regenerate the electrolyte layer. The cationic polyelectrolyte solution may comprise 10-10,000 ppm by weight cationic polyelectrolyte, or any sub-range subsumed therein, such as, for example, 100-5,000 ppm, 500-4,500 ppm, 1,000-4,000 ppm, or 2,000-4,000 ppm. The granular filtration medium may be contacted with the cationic polyelectrolyte solution for a period of time ranging from 10 minutes to 1.0 hour, or any sub-range subsumed therein, such as, for example, 10-30 minutes, 10-20 minutes, or 15-20 minutes. The granular filtration medium may be contacted with the cationic polyelectrolyte solution with air scouring for at least a portion of the contact time. For example, the granular filtration medium and the cationic polyelectrolyte solution may be contacted for a period of time with air scouring ranging from 3-20 minutes, followed by a period of time without air scouring ranging from 7-40 minutes, or any subranges subsumed therein, such as, for example, 5-10 minutes with air scouring and 10-15 minutes without scouring. After the period of contact between the granular filtration medium and the cationic polyelectrolyte solution, the electrolyte layer will be regenerated and the filter ready to restart filtration operations.

In implementation, the frequency with which the coated granular filtration medium will need to be reprocessed to strip coagulated contaminants, clean the medium, and regenerate the electrolyte layer will depend on the composition and concentration of contaminants in the feed water. During typical usage filtering wastewater from hydraulic fracturing operations, for example, the coated granular filtration medium will typically need reprocessing after 2-12 hours of use. The coated granular filtration medium can be used, reprocessed, re-used, reprocessed again, and so on, and the reprocessed medium performs just as effectively as the initially-coated granular filtration medium.

The reprocessing method does not remove an optional primer layer. However, over time, a primer layer may wear away and need to be regenerated. During typical usage filtering wastewater from hydraulic fracturing operations, for example, it is expected that a primer layer may need to be regenerated 2-3 times per year. An optional primer layer can be regenerated using the same procedures described above in connection with the initial production of the coated granular filtration medium.

In laboratory and field testing, coated granular filtration medium in accordance with this specification nearly completely removed all emulsified oils, iron, polymer particles, and suspended solids from wastewater, including submicron sized particles. The coated granular filtration medium in accordance with this specification can also reduce the residence time for filtration processes, for example, in some implementations, by an order of magnitude, to achieve coagulation-based clarification of wastewater.

EXAMPLES

Example 1: Production of Coated Granular Filtration Medium

A silica-based sand having an effective particle size of 90 micrometers was washed with tap water. The washed sand was immersed for 4 hours in a 0.2% (by weight) dopamine hydrochloride solution buffered at pH 8.2 with TRIS-HCl. The dopamine hydrochloride solution was drained from the sand. The sand was washed with tap water and dried in an oven operating at 60° C. A polydopamine layer was formed on the sand particles. The polydopamine-coated sand was immersed for 15 minutes in a 4,000 ppm (by weight) solution of poly(diallyldimethyl-ammonium chloride) with a weight average molecular weight of 400,000-500,000 g/mol. The mixture of polydopamine-coated sand and poly(diallyldimethyl-ammonium chloride) solution was air scoured for 5 minutes, followed by a 10 minute period of non-agitated contact. A poly(diallyldimethyl-ammonium chloride) layer having a "nanobrush" morphology was formed on the polydopamine layer, producing a coated granular filtration medium comprising silica-based sand core particles, a polydopamine primer layer, and a poly(diallyldimethyl-ammonium chloride) electrolyte layer.

Example 2: Filtration of Hydraulic Fracturing Wastewater

Wastewater from a hydraulic fracturing operation was obtained. The wastewater was filtered through a pressure filter having a cylindrical media bed (20.0 cm bed depth, 5.1 cm bed diameter) containing a coated granular filtration medium prepared in accordance with Example 1. The wastewater was passed through the filter at a pressure increasing from 5 psi at the initial condition to 17 psi at a fully-fouled condition and an average flow rate of approximately 0.1 gallons-per-minute (gpm) (normalized flowrate of about 5 gpm/ft$^2$).

The active microbial load, iron concentration, and turbidity were measured for the raw wastewater fed to the filter and the filtered water exiting the filter. The results of the measurements are shown in Table 1. The active microbial load was measured as cellular ATP concentration using a QuenchGone21 Wastewater (QG21W™) Kit, available from LuminUltra Technologies Ltd., New Brunswick, Canada. The iron concentration was measured using an Iron Test Kit (phenanthroline method) and Iron Low Range Test Kit (TPTZ Method), available from HANNA Instruments, Woonsocket, R.I., USA. The turbidity was measured using a Handheld Turbidimeter, available from Hach Company, Loveland, Colo., USA.

TABLE 1

| Measurement | Raw Wastewater | Filtered Water |
| --- | --- | --- |
| Microbial Load (pg cATP/mL) | 7400 | 1550 |
| Iron (mg/L) | 3.41 | 0.73 |
| Turbidity (NTU) | 204 | 22 |

Figure 5:
FIG. 5 is a photograph of raw wastewater before filtration using a coated granular filtration medium and the filtered water.

The coated granular filtration medium reduced active microbial load and iron content by 79% and reduced turbidity by 89%. The reduction in turbidity can be visually seen in FIG. 5, which shows samples of the raw wastewater and the filtered water.

Example 3: Comparison of Coated Granular Filtration Media

Figure 6:
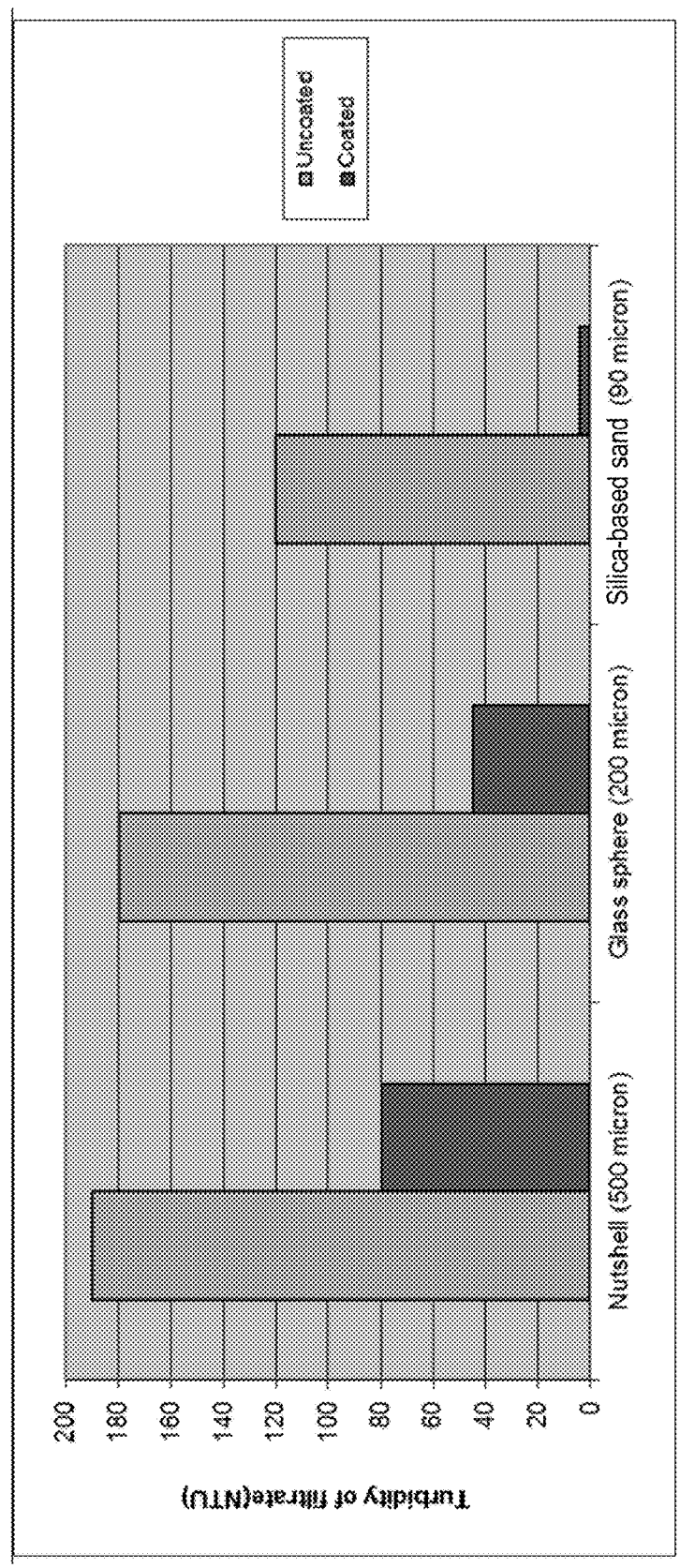
FIG. 6 is a bar graph showing turbidity measurements for three types of core particles, each with and without a primer layer and an electrolyte layer.

A coated granular filtration medium was prepared in accordance with Example 1. Two additional coated granular filtration media were prepared in accordance with Example 1, except the core particles for the two media were black walnut shells (500 micrometer effective particle size) and glass spheres (200 micrometer effective particle size). The three coated granular filtration media were used to filter an emulsified oil solution containing about 200 ppm by weight oil and having a turbidity of 200 (Handheld Turbidimeter, Hach Company, Loveland, Colo., USA). The three types of core particles (silica-based sand, black walnut shells, and glass spheres) were also used without any coating to filter the emulsified oil solution. The filtration was performed using the conditions described in Example 2. The turbidity of the six filtrates was measured. The results of the measurements are shown in FIG. 6.

Although the invention is described in this specification, at least in part, in the context of filtration of wastewaters from oil and gas extraction operations, it is understood that the invention is not necessarily limited to that context and is applicable to other types of industrial wastewater filtration and non-industrial water filtration.

Various features and characteristics of the invention are described in this specification and illustrated in the drawings to provide an overall understanding of the disclosed compositions, products, processes, and methods. It is understood that the various features and characteristics described in this specification and illustrated in the drawings can be combined in any operable manner regardless of whether such features and characteristics are expressly described or illustrated in combination in this specification. The Inventors and the Applicant expressly intend such combinations of features and characteristics to be included within the scope of this specification, and further intend that the claiming of such combinations of features and characteristics does not add matter to the application. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such claim amendments will not add new matter to the application, and will comply with written description and sufficiency of description requirements under 35 U.S.C. § 112(a). The compositions, products, processes, and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description and sufficiency of description requirements under 35 U.S.C. § 112(a). Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameter.

Any patent, publication, or other disclosure material identified in this specification is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. A granular filtration medium comprising:
   core particles;
   a primer layer deposited on the core particles; and
   an electrolyte layer comprising a cationic polyelectrolyte reversibly deposited on the primer layer.

2. The granular filtration medium of claim 1, wherein the core particles comprise silica-based sand particles having a particle size in the range of 50-150 micrometers.

3. The granular filtration medium of claim 1, wherein the primer layer comprises a non-ionic hydrophilic polymer.

4. The granular filtration medium of claim 3, wherein the primer layer comprises a non-ionic hydrophilic polymer having a zeta potential with an absolute value less than an absolute value of a zeta potential of the core particles.

5. The granular filtration medium of claim 3, wherein the primer layer comprises polydopamine.

6. The granular filtration medium of claim 1, wherein the electrolyte layer comprises poly(diallyldimethyl-ammonium chloride).

7. The granular filtration medium of claim 1, comprising:
   core particles comprising silica-based sand particles;
   the primer layer comprising polydopamine deposited on the silica-based sand particles; and
   an electrolyte layer comprising poly(diallyldimethyl-ammonium chloride) reversibly deposited on the primer layer.

8. A process for filtering water comprising flowing water through a filter comprising the granular filtration medium of claim 1.

9. The process of claim 8, further comprising mixing an oxidation agent with the water before flowing the water through the filter, wherein the oxidation agent comprises an aqueous sodium hypochlorite solution, an aqueous hydrogen peroxide solution, or an aqueous permanganate ($MnO_4$) salt solution.

* * * * *